United States Patent
Kang

(10) Patent No.: US 9,538,159 B2
(45) Date of Patent: Jan. 3, 2017

(54) APPARATUS AND METHOD FOR CAPTURING COLOR IMAGES AND DEPTH IMAGES

(71) Applicant: SAMSUNG ELECTRONICS CO., LTD., Suwon-si, Gyeonggi-do (KR)

(72) Inventor: ByongMin Kang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 771 days.

(21) Appl. No.: 13/768,107

(22) Filed: Feb. 15, 2013

(65) Prior Publication Data

US 2014/0055574 A1 Feb. 27, 2014

(30) Foreign Application Priority Data

Aug. 27, 2012 (KR) ........................ 10-2012-0093528

(51) Int. Cl.
| | | |
|---|---|---|
| *H04N 13/02* | (2006.01) | |
| *G02B 27/22* | (2006.01) | |
| *G03B 11/00* | (2006.01) | |
| *G03B 35/12* | (2006.01) | |

(52) U.S. Cl.
CPC ...... *H04N 13/0214* (2013.01); *G02B 27/2264* (2013.01); *G03B 11/00* (2013.01); *G03B 35/12* (2013.01); *H04N 13/021* (2013.01)

(58) Field of Classification Search
USPC ...... 348/49, 50, 46, 44, 33, 14.11, 164, 194, 348/211.9, 224.1, 237, 270, 273, 294, 348/340, 344, 360, 376, 425.4, 434.1, 348/464, 500, 513, 521, 525, 705, 733, 348/813, 820, 835, 239, 537; 250/214 LS, 250/226, 330, 338.1, 338.2, 339.14, 250/370.08, 461, 504 R, 208.1; 345/32, 345/158, 419, 545, 589; 396/520, 529, 396/535

See application file for complete search history.

(56) References Cited

U.S. PATENT DOCUMENTS

| | | | | |
|---|---|---|---|---|
| 5,854,819 | A  * | 12/1998 | Hara et al. ........................ | 378/34 |
| 6,535,232 | B1 * | 3/2003 | Tsuda et al. ................... | 715/849 |
| 7,560,679 | B1 * | 7/2009 | Gutierrez ................. | G01C 3/08 250/208.1 |
| 7,813,064 | B2 * | 10/2010 | Hsu et al. ...................... | 359/892 |
| 9,035,727 | B2 * | 5/2015 | Han ....................... | H01P 1/2084 333/203 |
| 2004/0252991 | A1* | 12/2004 | Kawai et al. ................. | 348/360 |
| 2005/0030657 | A1* | 2/2005 | Maier ........................ | G01J 3/02 359/885 |

(Continued)

FOREIGN PATENT DOCUMENTS

| | | |
|---|---|---|
| KR | 10-2005-0031421 | 4/2005 |
| KR | 10-2008-0029051 | 4/2008 |

(Continued)

*Primary Examiner* — Jefferey Harold
*Assistant Examiner* — Mustafizur Rahman
(74) *Attorney, Agent, or Firm* — Harness, Dickey & Pierce, P.L.C.

(57) ABSTRACT

An apparatus and method for capturing a color image and a depth image are utilized as a source of obtaining a three-dimensional (3D) image. The apparatus for capturing the color image and the depth image may include a filtering unit to employ a frame having a polarity which includes an external frame to support a plurality of filters which filter at least one of a visible ray and an infrared (IR) ray from a ray input via a lens, a driving unit to move the filtering unit by pushing or pulling the external frame based on a polarity of an applied signal, and a control unit to control a voltage to be applied to the driving unit based on a distance between the filtering unit and the driving unit.

20 Claims, 9 Drawing Sheets

(56) References Cited

U.S. PATENT DOCUMENTS

| | | | | |
|---|---|---|---|---|
| 2005/0174467 A1* | 8/2005 | Kawai | ............................ | 348/335 |
| 2005/0200743 A1* | 9/2005 | Kawai et al. | .................. | 348/360 |
| 2005/0286228 A1* | 12/2005 | Kim | ............................. | 361/704 |
| 2007/0146624 A1* | 6/2007 | Duston | ...................... | F24J 2/06 |
| | | | | 349/193 |
| 2008/0278034 A1* | 11/2008 | Egawa | ................. | H02N 2/0015 |
| | | | | 310/328 |
| 2008/0285872 A1* | 11/2008 | Fukuhara et al. | ............ | 382/248 |
| 2009/0190003 A1* | 7/2009 | Park | .......................... | G06T 5/50 |
| | | | | 348/239 |
| 2009/0195644 A1* | 8/2009 | Wakabayashi | ........ | G02B 26/085 |
| | | | | 348/51 |
| 2010/0128129 A1* | 5/2010 | Kim | ..................... | H04N 5/2226 |
| | | | | 348/164 |
| 2011/0007283 A1* | 1/2011 | Tanaka | ................. | H04N 9/3185 |
| | | | | 353/70 |
| 2011/0063505 A1* | 3/2011 | Seo | ...................... | H04N 9/3129 |
| | | | | 348/537 |
| 2011/0063574 A1* | 3/2011 | Freeman | .............. | G03B 21/006 |
| | | | | 353/7 |
| 2011/0128423 A1* | 6/2011 | Lee et al. | ....................... | 348/294 |
| 2012/0008672 A1* | 1/2012 | Gaddy | ................. | G06T 1/0028 |
| | | | | 375/240.01 |
| 2012/0145912 A1* | 6/2012 | Iwakiri et al. | ........... | 250/370.08 |

FOREIGN PATENT DOCUMENTS

| | | |
|---|---|---|
| KR | 10-2010-0059361 | 6/2010 |
| KR | 10-2011-0003696 | 1/2011 |

\* cited by examiner

APPARATUS AND METHOD FOR CAPTURING COLOR IMAGES AND DEPTH IMAGES

CROSS-REFERENCE TO RELATED APPLICATIONS

This application claims the priority benefit of Korean Patent Application No. 10-2012-0093528, filed on Aug. 27, 2012, in the Korean Intellectual Property Office, the disclosure of which is incorporated herein by reference.

BACKGROUND

1. Field

One or more embodiments of the following disclosure relate to an apparatus and a method for capturing a color image and a depth image that are utilized as a source of a three-dimensional (3D) image.

2. Description of the Related Art

A depth image may refer to an image in which a distance between an object positioned in a three-dimensional (3D) space and a camera for photographing the object is expressed based on a black and white unit. The depth image is widely used for 3D restoration technology.

A 3D image camera using a time division scheme may sequentially capture a color image and a depth image of an object over a time. Here, the 3D image camera using the time division scheme may include a single lens and a single sensor as a basic configuration.

SUMMARY

Additional aspects and/or advantages will be set forth in part in the description which follows and, in part, will be apparent from the description, or may be learned by practice of the invention.

The foregoing and/or other aspects are achieved by providing an apparatus for capturing a color image and a depth image, the apparatus including a filtering unit to employ a frame having a polarity. The filtering unit may include an external frame which supports a plurality of filters, to filter at least one of a visible ray and an infrared (IR) ray from a ray input via a lens. The apparatus may further include a driving unit to move the filtering unit by pushing or pulling the external frame based on a polarity of an applied signal, and a control unit to control a voltage to be applied to the driving unit based on a distance between the filtering unit and the driving unit.

The filtering unit may include a visible filter to filter the visible ray from the input ray, and an IR filter to filter the IR ray from the input ray.

The color image and depth image capturing apparatus may further include a frame unit spaced apart from the filtering unit by a predetermined distance to support the filtering unit.

The frame unit may include a first frame including a first magnetic portion, a second magnetic portion, and a first connecting portion connecting the first magnetic portion and the second magnetic portion to be in a horseshoe shape, and a second frame including a third magnetic portion, a fourth magnetic portion, and a second connecting portion connecting the third magnetic portion and the fourth magnetic portion to be in the horseshoe shape. One surface of the external frame may be spaced apart from the first magnetic portion, the second magnetic portion, and the first connecting portion to be positioned in an area in which a magnetic force of the first frame works, and another surface of the external frame may be spaced apart from the third magnetic portion, the fourth magnetic portion, and the second connecting portion to be positioned in an area in which a magnetic force of the second frame works.

Based on a polarity that occurs according to a voltage applied to a coil, the driving unit may perform a pushing operation with respect to the external frame in the case of having polarity identical to polarity of the external frame, and may perform a pulling operation with respect to the external frame in the case of having a polarity different from the polarity of the external frame.

The driving unit may include a first driving coil and a second driving coil that are disposed on both surfaces of the external frame, respectively. Based on a voltage applied to the first driving coil and the second driving coil, when the first driving coil performs the pushing operation with respect to the external frame, the second driving coil may perform the pulling operation with respect to the external frame, and when the first driving coil performs the pulling operation with respect to the external frame, the second driving coil may perform the pushing operation with respect to the external frame.

The control unit may control a magnitude of voltage to be applied to the driving unit so that the filtering unit and the driving unit may be separate from each other by at least a predetermined distance.

The control unit may control polarity of voltage to be applied to the first driving coil to be opposite to polarity of voltage to be applied to the second driving coil.

When the visible filter or the IR filter is positioned between the lens and a three-dimensional (3D) image sensor, the control unit may control an operation of the 3D image sensor based on a position of the visible filter or the IR filter so that the 3D image sensor may create a color image or a depth image.

The control unit may control the strength of a signal to be applied to the driving unit based on a length and a weight of the external frame, a length of the frame unit, and the number of windings of a coil that constitutes the driving unit.

The color image and depth image capturing apparatus may further include a detection unit disposed between the driving unit and the filtering unit to detect a distance between the external frame and the driving unit.

The color image and depth image capturing apparatus may further include a 3D image sensor to create a color image from the visible ray filtered by the filtering unit, and to create a depth image from the IR ray filtered by the filtering unit.

The foregoing and/or other aspects are achieved by providing an apparatus for capturing a color image and a depth image, the apparatus including a filtering unit to employ a frame having a polarity using an external frame supporting a plurality of filters, and to filter at least one of an visible ray and an IR ray from a ray input via a lens, a driving unit to move the filtering unit by pushing or pulling the external frame based on polarity of an applied signal, and a control unit to synchronize an operation of the filtering unit and an operation of a 3D image sensor so that the 3D image sensor may create a color image or a depth image, when the filtering unit is positioned between the lens and the 3D image sensor.

The control unit may control a magnitude of voltage to be applied to the driving unit so that the filtering unit and the driving unit may be separate from each other by at least a predetermined distance.

Based on a polarity that occurs according to a voltage applied to a coil, the driving unit may perform a pushing operation with respect to the external frame in the case of having polarity identical to polarity of the external frame and may performs a pulling operation with respect to the external frame in the case of having polarity different from the polarity of the external frame.

The foregoing and/or other aspects are achieved by providing an apparatus for capturing a color image and a depth image, the apparatus including an IR filter, a visible filter adjacent to the IR filter, an external frame supporting the IR filter and the visible filter, and having magnetism, and a driving unit periodically having a magnetism identical to or different from the magnetism of the external frame.

The foregoing and/or other aspects are achieved by providing a method of capturing a color image and a depth image, the method including controlling a voltage to be applied to driving coils based on a distance between an external frame and at least one of the driving coils, moving the external frame by pushing or pulling the external frame based on polarity of a signal applied to the driving coils, and employing a frame having a polarity and using an external frame supporting filters, and filtering at least one of an invisible ray and an IR ray from a ray input via a lens.

The filters may include an invisible filter to filter the invisible ray or an IR filter to filter the IR ray, and the color image and depth image capturing method may further include synchronizing an operation of the filters and an operation of a 3D image sensor so that the 3D image sensor may create a color image or a depth image, when the filters are positioned between the lens and the 3D image sensor.

The foregoing and/or other aspects are achieved by providing a method of capturing a color image and a depth image, the method including sequentially applying a first voltage to a first driving unit to move a filtering unit including a plurality of filters to position a first filter between a lens and a three-dimensional (3D) image sensor, and applying a second voltage to the first driving unit to move the filtering unit to position a second filter between the lens and the 3D image sensor. The method may further include creating one of a color image or a depth image when the first filter is positioned between the lens and the 3D image sensor and creating one of a color image or a depth image when the second filter is positioned between the lens and the 3D image sensor.

The method may also include detecting a distance between the first driving unit and the filtering unit when the filtering unit is moved by applying the first voltage, and stopping movement of the filtering unit when the filtering unit is a first predetermined distance away from the first driving unit. A distance further may be detected between a second driving unit and the filtering unit when the filtering unit is moved by applying the second voltage, and movement of the filtering unit may be stopped when the filtering unit is a second predetermined distance away from the second driving unit.

The method may further include switching the 3D image sensor from a non-operating state to an operating state when the filtering unit is the first predetermined distance away from the first driving unit to create one of a color image or a depth image, and switching the 3D image sensor from a non-operating state to an operating state when the filtering unit is the second predetermined distance away from the second driving unit to create one of a color image or a depth image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
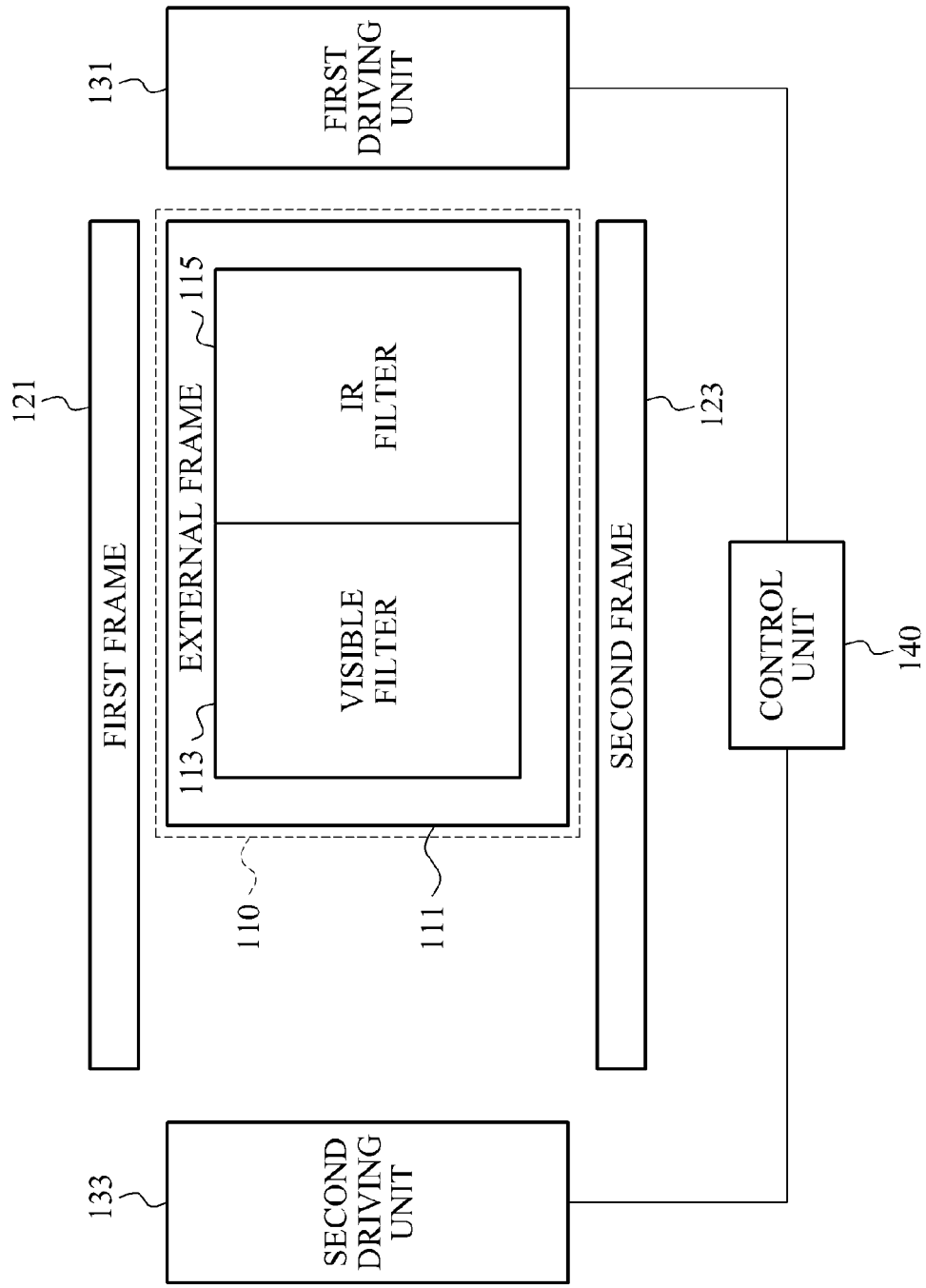
FIG. 1 illustrates an apparatus for capturing a color image and a depth image according to an embodiment.

Reference will now be made in detail to embodiments, examples of which are illustrated in the accompanying drawings, wherein like reference numerals refer to like elements throughout. Embodiments are described below to explain the present disclosure by referring to the figures.

A three-dimensional (3D) image capturing device (e.g., a camera) using a time division scheme may create a color image in the same manner as used in a general two-dimensional (2D) camera. The 3D image camera using the time division scheme may create a depth image using light that is reflected due to light emitted from a light source. The light source may be an embedded light emitting diode (LED) or laser diode (LD). The light source may be capable of emitting or radiating light of various wavelengths including wavelengths in the visible light spectrum, or infrared light spectrum, for example. Thus, an infrared (IR) ray may be emitted by the light source and utilized to create the depth image.

A color image may be created using ray reflected from an object due to a visible ray. A depth image may be created using ray reflected from the object due to a IR ray. The visible ray may include a ray that has a wavelength in the distribution of about 350 nm to about 650 nm. The IR ray may include a ray that has a wavelength of at least about 800 nm to about 2,500 nm. An apparatus for capturing a color image and a depth image according to an embodiment may be installed in the 3D image camera using the time division scheme.

FIG. 1 illustrates an apparatus for capturing a color image and a depth image (hereinafter, also referred to as a color image and depth image capturing apparatus) according to an embodiment.

Referring to FIG. 1, the color image and depth image capturing apparatus may include a filtering unit 110, a first driving unit 131, a second driving unit 133, and a control unit 140. The color image and depth image capturing apparatus may further include a first frame 121 and a second frame 123. FIG. 1 illustrates the first frame 121 and the second frame 123 as one configuration of a frame unit, and also illustrates the first driving unit 131 and the second driving unit 133 as one configuration of a driving unit.

The filtering unit 110 may employ a frame having a predetermined polarity, where the frame includes an external frame 111 which may support a plurality of filters. The filtering unit 110 may serve to filter at least one of a visible ray and an IR ray from a ray input via a lens. The filtering unit 110 may include the external frame 111. The external frame 111 may be a frame which supports a plurality of filters. For example, the external frame 111 may support a visible filter 113 and an IR filter 115. The external frame 111 may be formed as an electromagnet having a predetermined polarity. The external frame 111 may be formed in a rectangular or square shape. The external frame 111 having the rectangular or square shape may have one or more sides having the predetermined polarity.

The filtering unit 110 may include the visible filter 113 and the IR filter 115. The visible filter 113 may filter the visible ray from an input ray. The IR filter 115 may filter the IR ray from an input ray.

Each of the first frame 121 and the second frame 123 may have a polarity identical to a polarity of the external frame 111, and may support the filtering unit 110 in a state of being spaced apart from the filtering unit 110 by a predetermined distance. The predetermined distance may be determined based on a magnitude of the electromagnetic force of the external frame 111 and a respective magnitude of the electromagnetic force of the first frame 121 and the second frame 123.

The first frame 121 and the second frame 123 may be designed using a polarity-free material. A guide groove of each of the first frame 121 and the second frame 123 may be designed so that the filtering unit 110 may be slidably movable to left and right. The guide groove may be horseshoe shaped or u-shaped, for example. In this case, a portion of the external frame 111 adjacent to the first frame 121 and a portion of the external frame 111 adjacent to the second frame 123 may also be designed using a polarity-free material. According to another embodiment, magnetism may be inactivated in a portion of the external frame 111 adjacent to the first frame 121 and a portion of the external frame 111 adjacent to the second frame 123. For example, top and bottom portions of the external frame 111 may be inactive magnetically.

Each of the first driving unit 131 and the second driving unit 133 may move the filtering unit 110 by pushing or pulling the external frame 111 based on the polarity of an applied signal. For example, the filtering unit 110 may be pushed or pulled in a direction substantially orthogonal to the direction in which a ray of light is received. As can be seen from FIG. 3 and FIG. 4, for example, the filtering unit may be moved in a left or right direction (e.g., along an x-axis or lengthwise direction of the filtering unit), while the input ray is received via a lens in a direction substantially perpendicular to the filtering unit (e.g., along a y-axis or widthwise direction of the filtering unit).

Based on the polarity that occurs according to a voltage applied to a coil, each of the first driving unit 131 and the second driving unit 133 may perform a pushing operation with respect to the external frame 111 in the case of having a polarity identical to the polarity of the external frame 111, and may perform a pulling operation with respect to the external frame 111 in the case of having a polarity different from the polarity of the external frame 111.

The first driving unit 131 and the second driving unit 133 may be disposed on both surfaces of the external frame 111, respectively. For example, as can be seen from FIG. 1, the first driving unit 131 may be disposed on a first side or surface of the external frame 111 which is relatively closer to a first filter (e.g., the IR filter 115), while the second driving unit 133 may be disposed on a second, opposite side or surface of the external frame 111. That is, the second driving unit 133 may be disposed on a side which is relatively closer to the other filter (e.g., the visible filter 113). Here, the first driving unit 131 may include a first driving coil, and the second driving unit 133 may include a second driving coil. The first driving unit 131 and the second driving unit 133 may move the external frame 111 based on a voltage which is applied to the first driving coil and the second driving coil.

Magnetic fields of different directions may be formed on one surface and another surface of the first driving coil, respectively, based on the voltage applied to the first driving coil. Anode voltage may be applied to an input end of the first driving coil and cathode voltage may be applied to an output end of the first driving coil. Alternatively, cathode voltage may be applied to the input end of the first driving coil and anode voltage may be applied to the output end of the first driving coil. A magnetic field of a different direction may be referred to as an N-pole or an S-pole of an electromagnet.

Magnetic fields of different directions may be formed on one surface and another surface of the second driving coil, respectively, based on voltage applied to the second driving coil. Anode voltage may be applied to an input end of the second driving coil and cathode voltage may be applied to an output end of the second driving coil. Alternatively, cathode voltage may be applied to the input end of the second driving coil and anode voltage may be applied to the output end of the second driving coil. A magnetic field of a different direction may be referred to as an N-pole or S-pole of an electromagnet.

Each of the first driving coil and the second driving coil may be configured to be in a spiral form or a loop form.

When the first driving unit 131 performs the pushing operation with respect to the external frame 111 based on the voltage applied to the first driving coil, the second driving unit 133 may perform the pulling operation with respect to the external frame 111 based on the voltage applied to the second driving coil.

When the first driving unit 131 performs the pulling operation with respect to the external frame 111 based on the voltage applied to the first driving coil, the second driving unit 133 may perform the pushing operation with respect to the external frame 111 based on the voltage applied to the second driving coil.

In the case of having a polarity identical to the polarity of the external frame 111 based on a polarity that occurs due to a voltage applied to a coil, the first driving unit 131 or the second driving unit 133 may perform the pushing operation with respect to the external frame 111. For example, in the case where the first driving unit 131 and the side of the external frame 111 adjacent to the first driving unit 131 have the same polarity, a repulsive force may be generated such that the external frame 111 is pushed in a direction away from the first driving unit 131. By controlling a magnitude of the voltage level via the control unit 140, a degree of the pushing force may further be controlled.

In the case of having a polarity different from the polarity of the external frame 111 based on the polarity that occurs due to the voltage applied to the coil, the first driving unit 131 or the second driving unit 133 may perform the pulling operation with respect to the external frame 111. For example, in the case where the first driving unit 131 and the side of the external frame 111 adjacent to the first driving unit 131 have a different polarity, an attractive force may be generated such that the external frame 111 is pulled in a direction toward the first driving unit 131. By controlling a magnitude of the voltage level via the control unit 140, a degree of the pulling force may further be controlled.

The control unit 140 may control the polarity of voltage to be applied to the first driving coil to be opposite to the polarity of voltage to be applied to the second driving coil. When feeding voltage to the first driving coil, the control unit 140 may apply anode voltage and cathode voltage to a direction different from the second driving coil. A further detailed example will be described with reference to FIG. 3 and FIG. 4.

The control unit 140 may control the voltage to be applied to the first driving unit 131 and the second driving unit 133, based on a distance between the filtering unit 110 and the first driving unit 131 or the second driving unit 133. The control unit 140 may control a magnitude and polarity of voltage to be applied to the first driving unit 131 and the second driving unit 133, so that the filtering unit 110 may be separate from the first driving unit 131 or the second driving unit 133 by at least a predetermined distance.

The control unit 140 may control a magnitude of voltage to be applied to the first driving unit 131 and the second driving unit 133, so that the filtering unit 110 may be separate from the first driving unit 131 or the second driving unit 133 by at least a predetermined distance.

When the visible filter 113 or the IR filter 115 is positioned between a lens (not shown) and a 3D image sensor (not shown), the control unit 140 may control an operation of the 3D image sensor based on a position of the visible filter 113 or the IR filter 115, so that the 3D image sensor may create a color image or a depth image.

The control unit 140 may control the strength of a signal to be applied to the first driving unit 131 and the second driving unit 133, based on a length and a weight of the external frame 111, a length of each of the first frame 121 and the second frame 123, and the number of windings of a coil that constitutes the first driving unit 131 and the second driving unit 133.

When the filtering unit 110 is positioned between the lens and the 3D image sensor, the control unit 140 may synchronize an operation of the filtering unit 110 and an operation of the 3D image sensor so that the 3D image sensor may create a color image or a depth image.

When the visible filter 113, the lens, and the 3D image sensor are arranged in a line, the control unit 140 may transmit an operational signal to the 3D image sensor. When the 3D image sensor receives the operational signal from the control unit 140, the 3D image sensor may create a color image from a visible ray filtered by the visible filter 113. For example, the filtering unit may be positioned such that the visible filter 113 is substantially centered along the lengthwise direction of the first frame 121 and/or second frame 123, so that the visible filter 113, lens, and 3D image sensor are aligned.

When the IR filter 115, the lens, and the 3D image sensor are arranged in a line, the control unit 140 may transmit an operational signal to the 3D image sensor. When the 3D image sensor receives the operational signal from the control unit 140, the 3D image sensor may create a depth image from an IR ray filtered by the IR filter 115. For example, the filtering unit may be positioned such that the IR filter 115 is substantially centered along the lengthwise direction of the first frame 121 and/or second frame 123, so that the IR filter 115, lens, and 3D image sensor are aligned.

According to another embodiment, the color image and depth image capturing apparatus may include only one of the first driving unit 131 and the second driving unit 133. In this case, only one frame in the external frame 111 of the filtering unit 110 may have magnetism. One of the first driving unit 131 and the second driving unit 133 may be disposed in a direction corresponding to a frame having the magnetism. Using the first driving unit 131 or the second driving unit 133, a gravitational or attractive force or a repulsive force may be periodically applied to the filtering unit 110. For example, in the case that only the first driving unit 131 is present, then only one side of the external frame 111 of the filtering unit 110 may need to have magnetism. For example, the side of the external frame 111 which is adjacent to the IR filter 115 and between the IR filter 115 and first driving unit 131 may have a predetermined polarity, and the polarity of the first driving unit 131 may be altered accordingly to control the positioning of the IR filter 115 and the visible filter 113.

Figure 2:
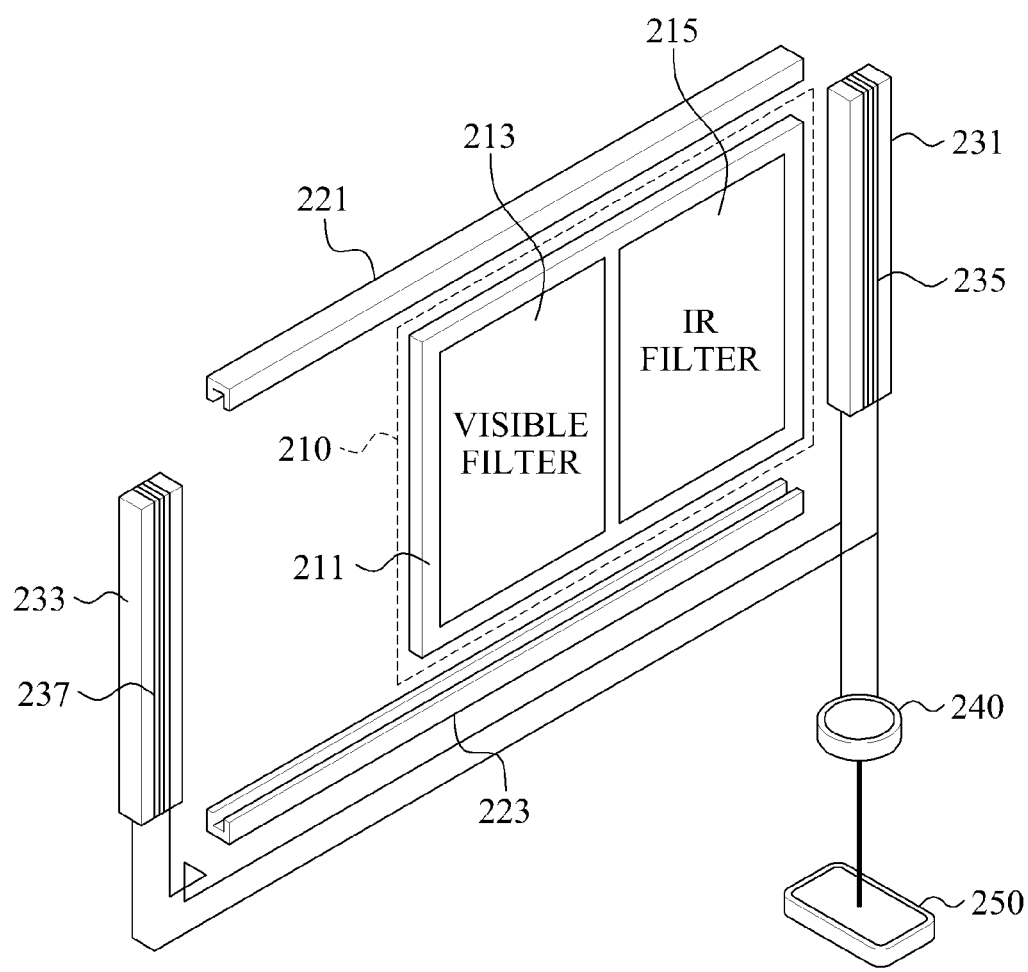
FIG. 2 illustrates an apparatus for capturing a color image and a depth image according to another embodiment.

FIG. 2 illustrates an apparatus for capturing a color image and a depth image according to another embodiment.

Referring to FIG. 2, the color image and depth image capturing apparatus may include a filtering unit 210, a first filter frame 221, a second filter frame 223, a first electromagnet 231, a second electromagnet 233, a power unit 240, and a control unit 250.

The filtering unit 210 may include an external frame 211, a visible filter 213, and an IR filter 215. The external frame 211 may be a frame that maintains and supports a shape of each of the visible filter 213 and the IR filter 215. The external frame 211 may be formed using an electromagnet.

The first and second filter frames 221 and 223 may be disposed on opposite sides of the filtering unit 210, respectively, to support the filtering unit 210. Each of the filter frames 221 and 223 may be formed using an electromagnet. A polarity of the first filter frame 221 may be identical to the polarity of the external frame 221, and the external frame 211 may be spaced apart from the first filter frame 221 by a predetermined distance. Also, a polarity of the second filter frame 223 may be identical to the polarity of the external frame 211, and the external frame 211 may be spaced apart from the second filter frame 223 by a predetermined distance.

Each of the first and second filter frames 221 and 223 may also be formed using a material that is not magnetized. The first and second filter frames 221 and 223 may be have polarities which are identical to one another, or different from one another.

Each of the first and second electromagnets 231 and 233 may move the filtering unit 210 in response to an adjustment of an electromagnetic force that occurs based on the magnitude of voltage applied to a coil. The first electromagnet 231 may push or pull the filtering unit 210 based on a polarity and magnitude of voltage applied to a first coil 235. The second electromagnet 233 may push or pull the filtering unit 210 based on polarity and magnitude of voltage applied to a second coil 237.

The power unit 240 may supply power to the first and second coils 235 and 237. The power unit 240 may apply voltage of identical polarity to an input end that is positioned to be relatively close to the filtering unit 210, between the input ends of the first and second coils 235 and 237. Also, the power unit 240 may apply voltage of identical polarity to an input end that is positioned to be relatively further away from the filtering unit 210, between the input ends of the first and second coils 235 and 237.

The control unit 250 may control the magnitude and polarity of voltage that is supplied from the power unit 240. The control unit 250 may adjust the magnitude of voltage that is supplied from the power unit 240, based on a distance between the filtering unit 210 and the first or second electromagnet 231 or 233. The control unit 250 may adjust the polarity of the voltage that is supplied from the power unit 240, so that the visible filter 213 or the IR filter 215, a lens (not shown), and a 3D image sensor (not shown) may be arranged in a line, according to whether a color image or depth image is desired to be obtained. For example, to push the IR filter 215 from the electromagnet 231, a voltage may be applied to the first coil 235 to have a polarity identical to the polarity of the external frame 211. More specifically, when the polarity of the external frame 211 is an S-pole, voltage may be applied to the first coil 235 so that the S-pole may be formed in a direction of the filtering unit 210.

While supporting the filtering unit 210, the first and second filter frames 221 and 223 may be spaced apart from each other due to an electromagnetic force. Therefore, when the filtering unit 210 is moving, noise by friction may not occur. Also, when an electromagnetic force of greater than or equal to air resistance is formed in the first or second electromagnet 231 or 233, the filtering unit 210 may move by the formed electromagnetic force and thus, may move more quickly than a mechanical movement.

Figure 3:
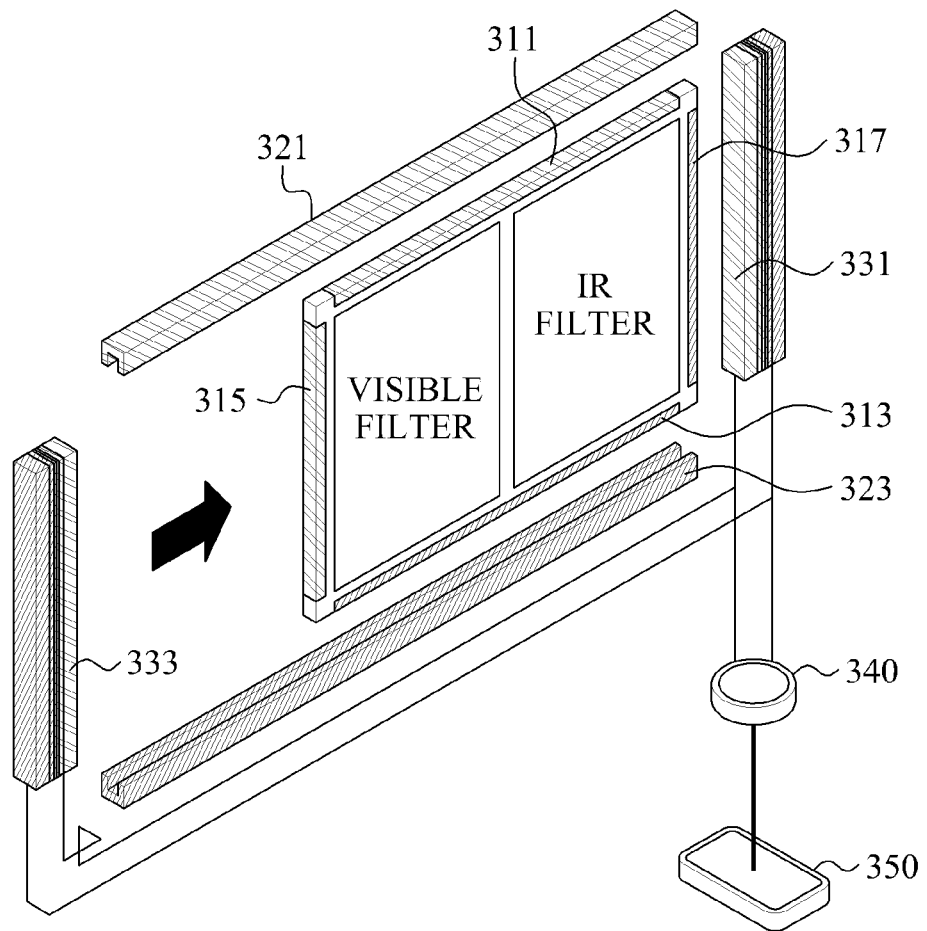
FIG. 3 illustrates an example of moving a filter in an apparatus for capturing a color image and a depth image according to an embodiment.

FIG. 3 illustrates an example of moving a filter in an apparatus for capturing a color image and a depth image according to an embodiment.

FIG. 3 illustrates an example of moving a visible filter to be positioned between a lens and a 3D image sensor. Each of portions 311, 313, 315, and 317 of an external frame may be formed using an electromagnet. Here, the portions 311, 313, 315, and 317 may be formed using electromagnets having identical polarity, and may also be formed using electromagnets having different polarity.

For example, the polarity of a filter frame 321 may be identical to a polarity of the portion 311 of the external frame. Accordingly, the filter frame 321 and the portion 311 may be separate from each other. Also, a polarity of a filter frame 323 may be identical to a polarity of the portion 313. Accordingly, the filter frame 323 and the portion 313 may be separate from each other.

When the inner polarity of an electromagnet 333 is identical to the polarity of the portion 315, the visible filter may be pushed away from the electromagnet 333 and be moved. An electromagnetic force occurring in the electromagnet 333 may be adjusted to be greater than the resistance that is required to move the visible filter.

When the inner polarity of an electromagnet 331 is different from the polarity of the portion 317, the portion 317 may be pulled toward the electromagnet 331 so that an IR filter may enter within a predetermined distance from the electromagnet 331. When the IR filter enters within the predetermined distance, a control unit 350 may change the inner polarity of the electromagnet 331 to be identical to the polarity of the portion 317. When the inner polarity of the electromagnet 331 is changed to be identical to the polarity of the portion 317, the electromagnet 331 may push the portion 317 so that the IR filter may not further move towards the electromagnet 331 from within the predetermined distance. Here, the electromagnetic force occurring in the electromagnet 331 may be adjusted to be a magnitude that is required to stop the IR filter within the predetermined distance. Accordingly, movement of the IR filter as well as the visible filter may be stabilized and a position of the IR filter and visible filter may be momentarily maintained such that the visible filter is positioned between a lens and a 3D image sensor, so that the visible filter may filter visible rays from the input ray to obtain a color image.

For example, power may be supplied from a power unit 340 so that an inside of the electromagnets 331 and 333 may operate as an N-pole and outside thereof may operate as an S-pole. The control unit 350 may adjust the magnitude and polarity of voltage that is supplied from the power unit 340 to the electromagnets 331 and 333. Referring to FIG. 3, the same hatching shape indicates identical polarity and a different hatch shape indicates different polarity.

Figure 4:
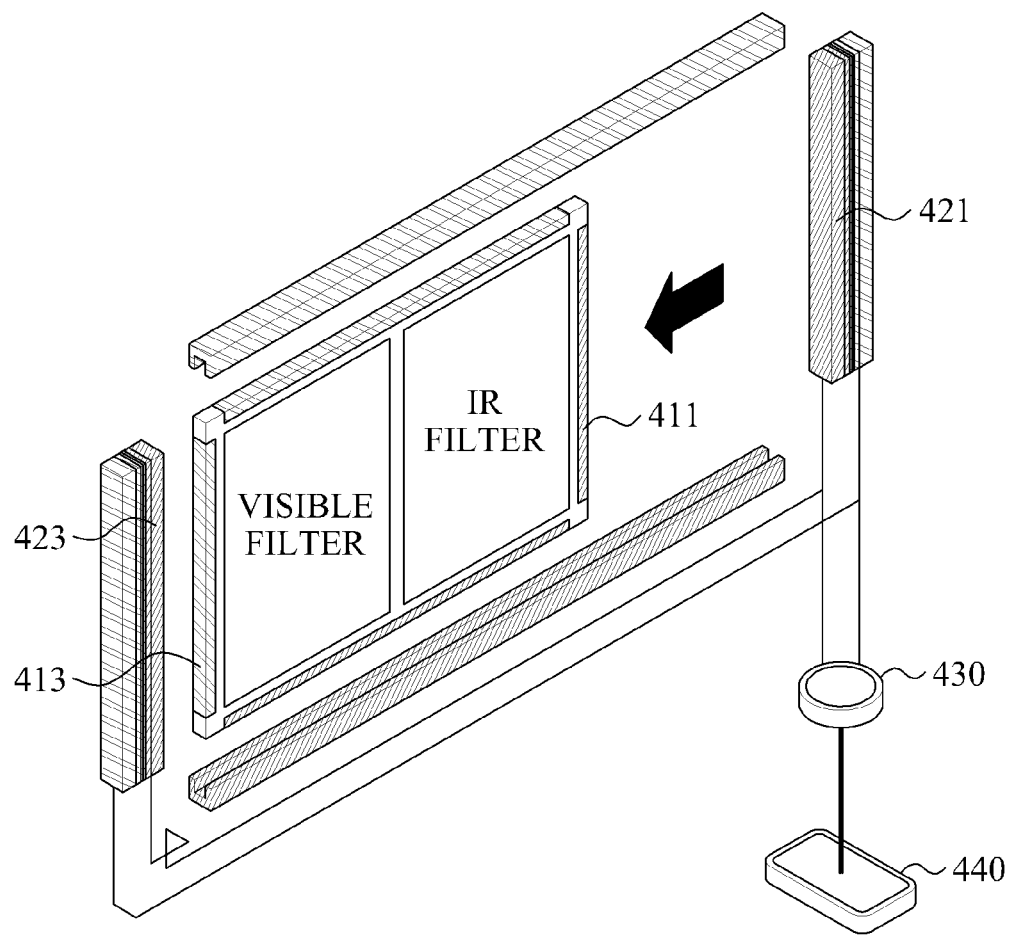
FIG. 4 illustrates another example of moving a filter in an apparatus for capturing a color image and a depth image according to an embodiment.

FIG. 4 illustrates another example of moving a filter in an apparatus for capturing a color image and a depth image according to an embodiment.

FIG. 4 illustrates an example of moving an IR filter to be positioned between a lens and a 3D image sensor. Each of portions 411 and 413 of an external frame may be formed using an electromagnet. Here, the portions 411 and 413 may be formed using electromagnets having identical polarity, and may also be formed using electromagnets having different polarity.

When the inner polarity of an electromagnet 421 is identical to the polarity of the portion 411, the IR filter may be pushed from the electromagnet 421 and be moved. An electromagnetic force occurring in the electromagnet 421 may be adjusted to be greater than the resistance that is required to move the visible filter.

When the inner polarity of an electromagnet 423 is different from polarity of the portion 413, the portion 413 may be pulled toward the electromagnet 423 so that a visible filter may enter within a predetermined distance from the electromagnet 423. When the visible filter enters within the predetermined distance, a control unit 440 may change the inner polarity of the electromagnet 423 to be identical to the polarity of the portion 413. When the inner polarity of the electromagnet 423 is changed to be identical to the polarity of the portion 413, the electromagnet 423 may push the portion 413 so that the visible filter may not further move towards the electromagnet 423 from within the predetermined distance. Here, the electromagnetic force occurring in the electromagnet 423 may be adjusted to be a magnitude that is required to stop the visible filter within the predetermined distance. Accordingly, movement of the visible filter as well as the IR filter may be stabilized and a position of the visible filter and IR filter may be momentarily maintained such that the IR filter is positioned between a lens and a 3D image sensor, so that the IR filter may filter IR rays from the input ray to obtain a depth image.

For example, power may be supplied from a power unit 430 so that an inside of the electromagnets 421 and 423 may operate as an S-pole and outside thereof may operate as an N-pole. The control unit 440 may adjust the magnitude and polarity of the voltage that is supplied from the power unit 430 to the electromagnets 421 and 423. Referring to FIG. 4, the same hatching shape indicates identical polarity and a different hatch shape indicates different polarity.

In the case that only one driving unit is present, then the inner polarity of an electromagnet may be changed to have an identical or different polarity from portion 411 or portion 413 (depending on which side of the external frame the electromagnet is disposed). If the one driving unit corresponds to electromagnet 423 which is disposed adjacent to portion 413, the electromagnet 423 may have a different polarity than the polarity of portion 413 so that the portion 413 may be pulled toward the electromagnet so that a visible filter may enter within a predetermined distance from the electromagnet 423. When the visible filter enters within the predetermined distance, the control unit 440 may change the inner polarity of the electromagnet 423 to be identical to the polarity of the portion 413. When the inner polarity of the electromagnet 423 is changed to be identical to the polarity of the portion 413, the electromagnet 423 may push the portion 413 so that the visible filter may not further move towards the electromagnet 423 from within the predetermined distance. Here, the electromagnetic force occurring in the electromagnet 423 may be adjusted to be a magnitude that is required to stop the visible filter within the predetermined distance. Accordingly, movement of the visible filter as well as the IR filter may be stabilized and a position of the visible filter and IR filter may be momentarily maintained such that the IR filter is positioned between a lens and a 3D image sensor, so that the IR filter may filter IR rays from the input ray to obtain a depth image.

Likewise, to have the visible filter positioned between a lens and a 3D image sensor in the case that only one driving unit is present using the above example, the inner polarity of electromagnet 423 may be maintained to have an identical polarity as portion 413 and a magnitude of the electromagnetic force may be increased to cause the visible filter away to be moved away from the electromagnet 423, so that the portion 413 may be pushed away from the electromagnet so that the IR filter may enter within a predetermined distance from the electromagnet 421. When the IR filter enters within the predetermined distance, the control unit 440 may decrease the magnitude of the electromagnetic force, for example, so that the visible filter may not further move away the electromagnet 423 or within the predetermined distance from electromagnet 421. Here, the electromagnetic force occurring in the electromagnet 423 may be adjusted to be a magnitude that is required to stop the IR filter within the predetermined distance. Accordingly, movement of the visible filter as well as the IR filter may be stabilized and a position of the visible filter and IR filter may be momentarily maintained such that the visible filter is positioned between a lens and a 3D image sensor, so that the visible filter may filter visible rays from the input ray to obtain a color image.

Figure 5:
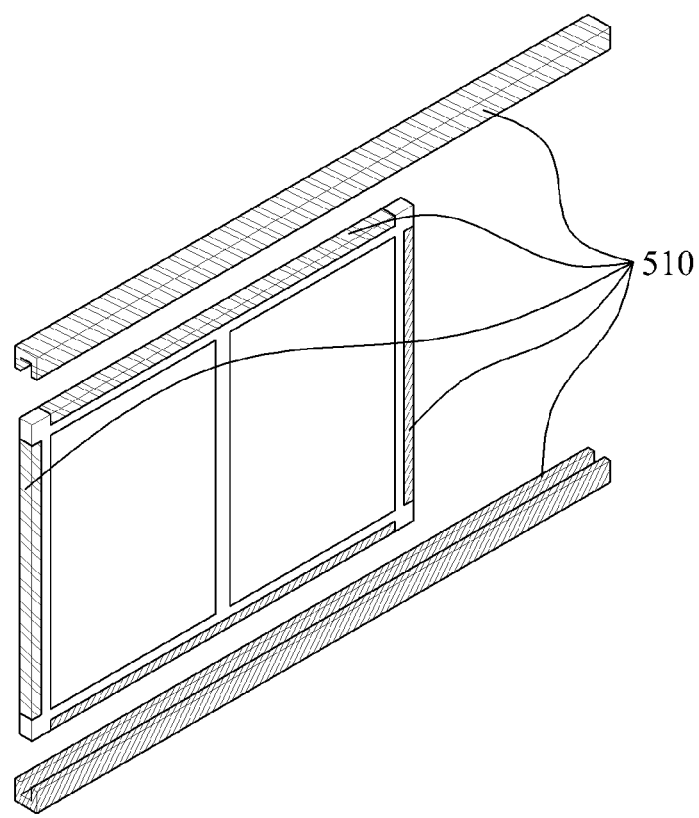
FIG. 5 illustrates a frame unit and a filtering unit that constitute an apparatus for capturing a color image and a depth image according to an embodiment.

FIG. 5 illustrates a frame unit and a filtering unit that constitute an apparatus for capturing a color image and a depth image according to an embodiment.

Referring to FIG. 5, each of a filter frame that constitute the frame unit and an external frame that constitutes the filtering unit may be formed using an electromagnet 510. When each of the filter frame and the external frame is formed using the electromagnet 510, resistance by contact between the filter frame and the external frame may not occur. Accordingly, when a light force is applied to the external frame, the filtering unit may easily move within the filter frame. As can be seen from FIG. 5, the first frame of the filter frame positioned adjacent to an upper side portion of the external frame has a polarity identical to the polarity of the upper side portion. Likewise, the second frame of the filter frame positioned adjacent to a bottom side portion of the external frame has a polarity identical to the polarity of the bottom side portion. Further, the first frame and second frame which constitute the frame unit have different polarities, though this is only one example, and they may have identical polarities.

Figure 6:
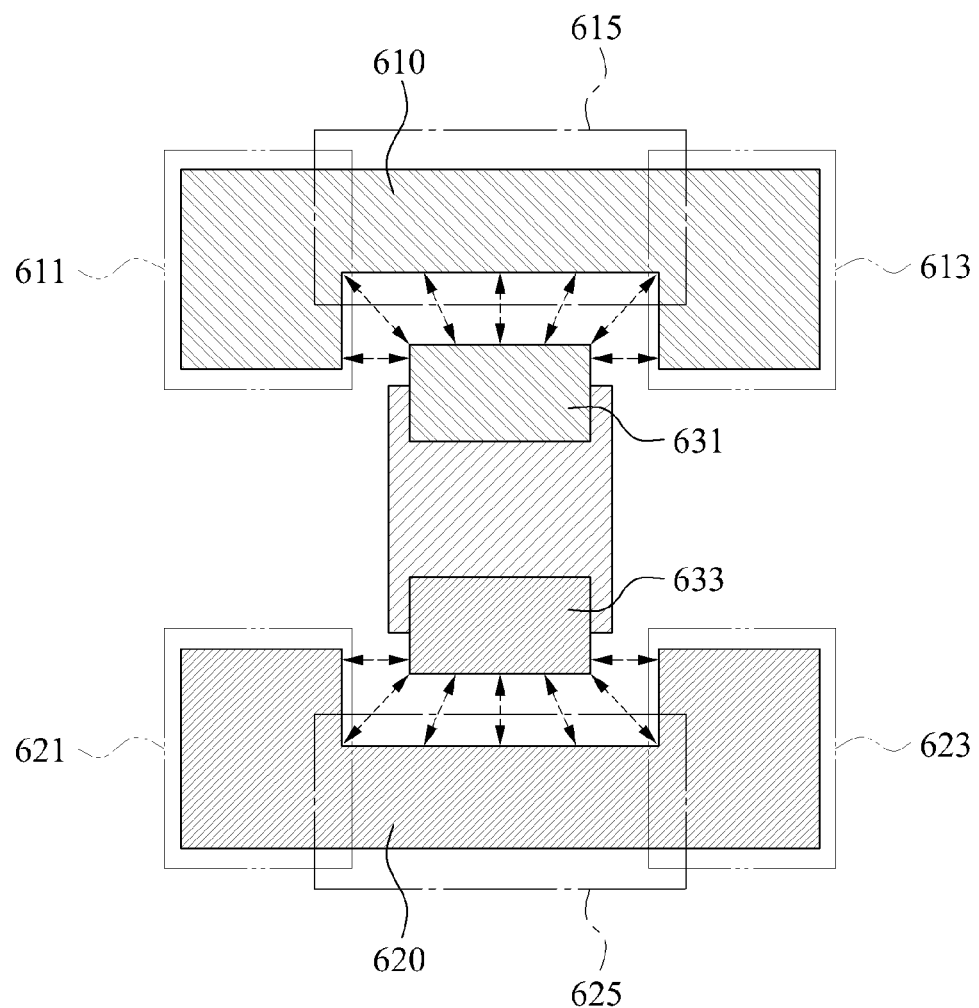
FIG. 6 illustrates a distance between a frame unit and a filtering unit that constitute an apparatus for capturing a color image and a depth image according to an embodiment.

FIG. 6 illustrates a distance between a frame unit and a filtering unit that constitute an apparatus for capturing a color image and a depth image according to an embodiment.

Referring to FIG. 6, the frame unit may include a first frame 610 and a second frame 620. The first frame 610 may include a first magnetic portion 611, a second magnetic portion 613, and a first connecting portion 615. The first connecting portion 615 may connect the first magnetic portion 611 and the second magnetic portion 613 to be in a horseshoe shape or a u-shape configuration. The second frame 620 may include a third magnetic portion 621, a fourth magnetic portion 623, and a second connecting portion 625. The second connecting portion 625 may connect the third magnetic portion 621 and the fourth magnetic portion 623 to be in the horseshoe shape or u-shape configuration.

A first surface 631 of the external frame may be spaced apart from the first magnetic portion 611, the second magnetic portion 613, and the first connecting portion 615 to be positioned in an area in which a magnetic force of the first frame 610 works, and a second surface 633 of the external frame may be spaced apart from the third magnetic portion 621, the fourth magnetic portion 623, and the second connecting portion 625 to be positioned in an area in which a magnetic force of the second frame 620 works.

The first surface 631 of the external frame may be positioned within the first frame 610 in the horseshoe shape and be supported. The second surface 633 of the external frame may be positioned within the second frame 620 in the horseshoe shape and be supported. The area within the first frame 610 in the horseshoe shape may be referred to as a first guide groove of the first frame 610 and the area within the second frame 620 in the horseshoe shape may also be referred to as a second guide groove of the second frame 620. The first and second guide grooves may be designed so that the first and second surfaces 631 and 633 of the external frame may be slidable in left and right directions.

A distance between the first surface 631 of the external frame and the first frame 610 may be adjusted based on the magnitude of electromagnetic force of an electromagnet. Also, a distance between the second surface 633 of the external frame and the second frame 620 may be adjusted based on magnitude of electromagnetic force of an electromagnet. For example, a greater electromagnetic force may result in a greater distance between the first surface 631 and the first frame, due to the identical polarities.

Figure 7:
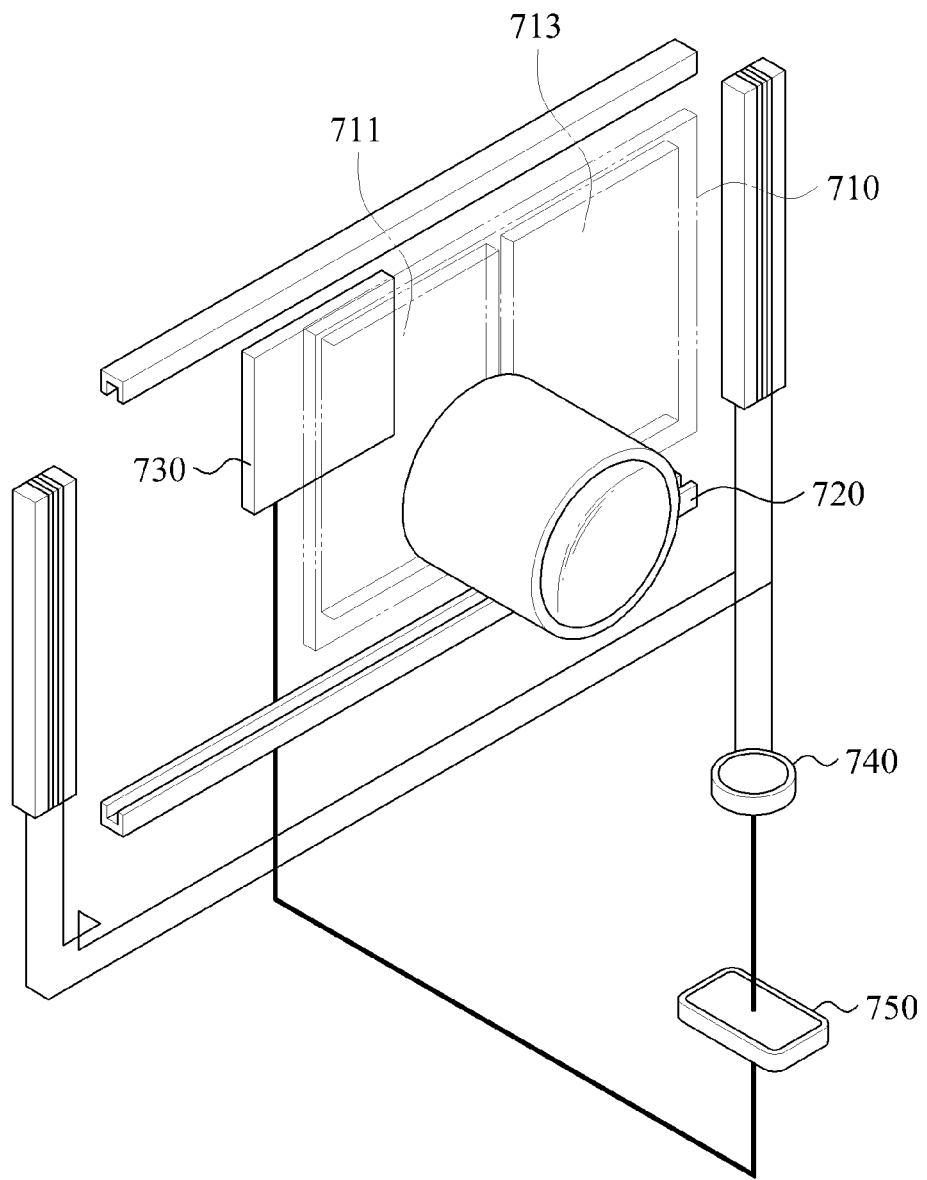
FIG. 7 illustrates an apparatus for capturing a color image and a depth image according to still another embodiment.

FIG. 7 illustrates an apparatus for capturing a color image and a depth image according to still another embodiment.

Referring to FIG. 7, compared to the color image and depth image capturing apparatus of FIG. 1, the color image and depth image capturing apparatus of FIG. 7 may further include a 3D image sensor 730 and a lens 720. Accordingly, with respect to a remaining configuration excluding the 3D image sensor 730 and the lens 720, the description made above with reference to FIG. 1 may be applied as is.

The lens 720 may concentrate at least one of a visible ray and an IR ray that are reflected from an object to be photographed.

The 3D image sensor 730 may create a color image from the visible ray filtered by a filtering unit 710, and may create a depth image from the IR ray filtered by the filtering unit

710. The color image and depth image capturing apparatus may include a memory (not shown). The color image and/or depth images which are created may be stored in the internal memory or an external memory for use in processing the images at a later time. For example, the color images and depth images may be used separately or together to create a three-dimensional image. The internal or external memory may include read-only memory (ROM), random-access memory (RAM), CD-ROMs, magnetic tapes, floppy disks, optical data storage devices, and the like.

The filtering unit 710 may include a visible filter 711 and an IR filter 713. The visible filter 711 may filter a visible ray from light concentrated by the lens 720. The IR filter 713 may filter an IR ray from the light concentrated by the lens 720.

A power unit 740 may apply voltage to an electromagnet so that the visible filter 711 may be positioned between the lens 720 and the 3D image sensor 730. When the visible filter 711 is positioned between the lens 720 and the 3D image sensor 730, a control unit 750 may control an operation of the 3D image sensor 730 so that the 3D image sensor 730 may operate. The 3D image sensor 730 may create a color image from the filtered visible ray.

The power unit 740 may apply voltage to an electromagnet so that the IR filter 713 may be positioned between the lens 720 and the 3D image sensor 730. When the IR filter 713 is positioned between the lens 720 and the 3D image sensor 730, the control unit 750 may control an operation of the 3D image sensor 730 so that the 3D image sensor 730 may operate. The 3D image sensor 730 may create a depth image from the filtered IR ray.

The control unit 750 may control an operation of the 3D image sensor 730 based on a position of the visible filter 711 or a position of the IR filter 713.

Figure 8:
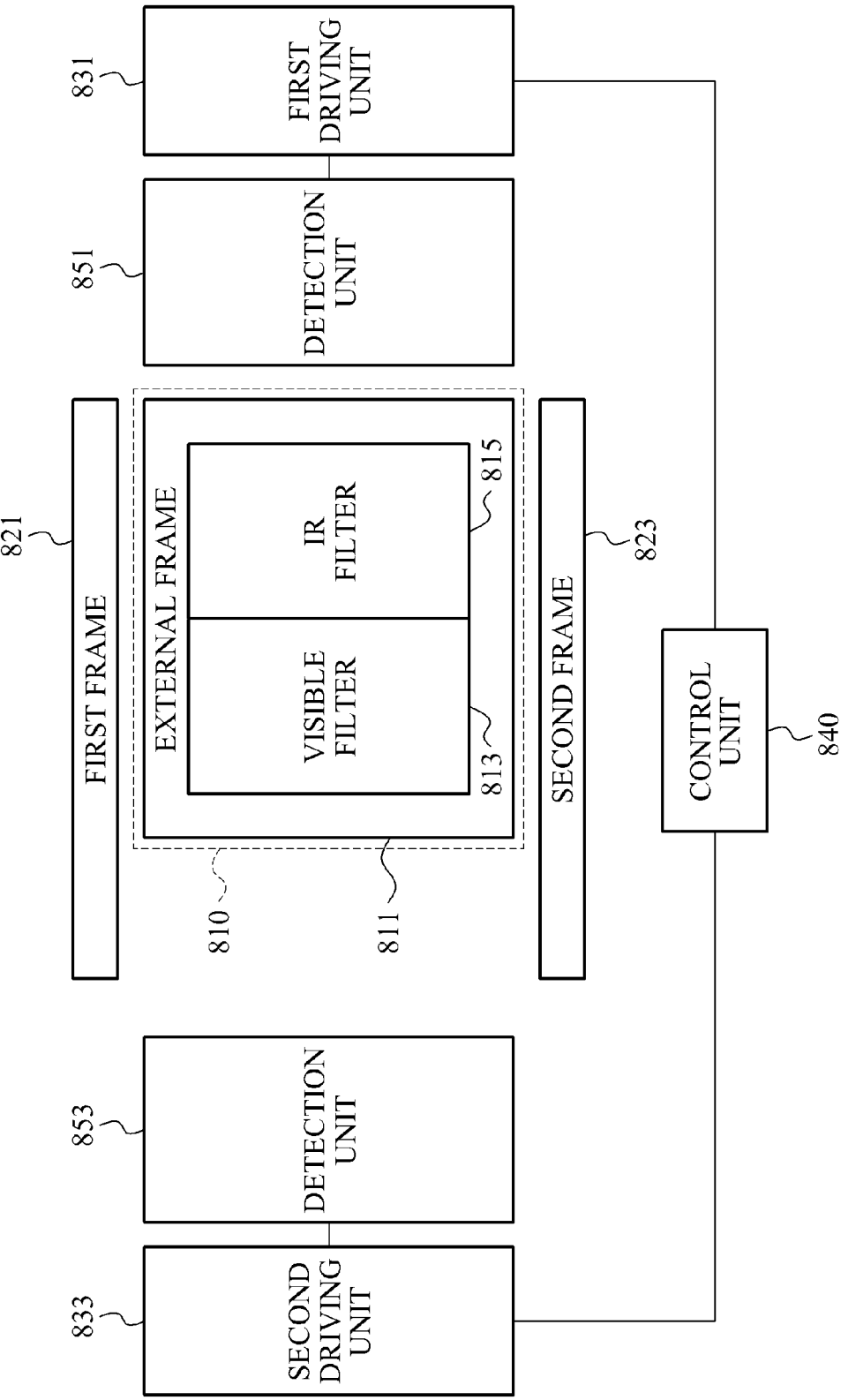
FIG. 8 illustrates an apparatus for capturing a color image and a depth image according to yet another embodiment.

FIG. 8 illustrates an apparatus for capturing a color image and a depth image according to another embodiment.

Referring to FIG. 8, the color image and depth image capturing apparatus may include a filtering unit 810, a first frame 821, a second frame 823, a first driving unit 831, a second driving unit 833, a control unit 840, a first detection unit 851, and a second detection unit 853. Here, the first frame 821 and the second frame 823 are illustrated as one configuration of a driving unit. Compared to the color image and depth image capturing apparatus of FIG. 1, the color image and depth image capturing apparatus of FIG. 8 may further include the detection units 851 and 853. Accordingly, with respect to a remaining configuration excluding the detection units 851 and 853, the description made above with reference to FIG. 1 may be applied as is.

The first detection unit 851 may be disposed between the first driving unit 831 and the filtering unit 810 to detect a distance between an external frame 811 and the first driving unit 831. The second detection unit 853 may be disposed between the second driving unit 833 and the filtering unit 810 to detect a distance between the external frame 811 and the second driving unit 833. Each of the detection units 851 and 853 may be configured as a sensor. A complementary metal-oxide semiconductor (CMOS) image sensor, a charge coupled device (CCD) image sensor, and the like may be employed for the sensor. The first detection unit 851 may determine whether the external frame 811 is a predetermined distance away from the first driving unit, or a predetermined distance away from the second driving unit. Likewise, the second detection unit 853 may determine whether the external frame 811 is a predetermined distance away from the first driving unit, or a predetermined distance away from the second driving unit. Thus, only one detection unit may be necessary. For example, when the IR filter is centered or positioned between the lens and the 3D image sensor, the first detection unit 851 may infer or determine that a first surface of the external frame 811 facing the second driving unit 833 is a first predetermined distance away from the second driving unit 833 by the distance between the first driving unit 831 and a second surface of the external frame 811 facing the first driving unit 831. Further, when the visible filter is centered or positioned between the lens and the 3D image sensor, the first detection unit 851 may determine that the external frame 811 is a second predetermined distance away from the first driving unit 831 by the distance between the first driving unit 831 and the surface of the external frame 811 facing the first driving unit 831. Here, it can be seen that the second predetermined distance is less than the first predetermined distance.

Figure 9:
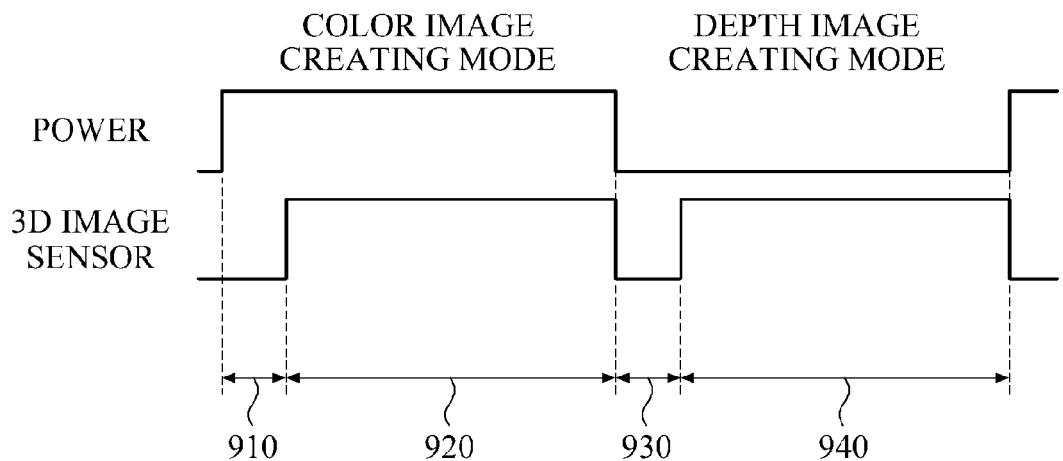
FIG. 9 illustrates a graph showing an operation time of a three-dimensional (3D) image sensor based on voltage applied from a power source of an apparatus for capturing a color image and a depth image according to an embodiment.

FIG. 9 illustrates a graph showing an operation time of a 3D image sensor based on a voltage which is applied from a power source of an apparatus for capturing a color image and a depth image according to an embodiment.

In the color image and depth image capturing apparatus, an operation of a visible filter or an IR filter may be associated with an operation of the 3D image sensor. That is, when the visible filter is positioned between a lens and the 3D image sensor, the visible filter and the 3D image sensor may need to perform an operation. Alternatively, when the IR filter is positioned between the lens and the 3D image sensor, the IR filter and the 3D image sensor may need to perform an operation.

In order to interactively operate the 3D image sensor and the visible filter or the IR filter, a control unit may synchronize an operational signal and transmit the synchronized operational signal to the 3D image sensor.

A power unit may change a level of voltage to be applied to an electromagnet based on the operational signal of the control unit. The polarity of the electromagnet may be changed based on the voltage applied by the power unit. The visible filter and the IR filter may move in response to the change in the polarity of the electromagnetic.

Referring to the graph of FIG. 9, when a high signal is applied to power, the visible filter may move to be between the lens and the 3D image sensor during a period of time 910. During the period of time 910, a high signal may not be input to the 3D image sensor. That is, the 3D image sensor may not operate. During a period of time 920 in which a high signal is input to the 3D image sensor, the 3D image sensor may create a color image from a visible ray filtered by the visible filter. That is, during the period of time 920, the 3D image sensor is activated and a high signal is applied to both the 3D image sensor and the power. The period of time 910 may be set in advance by the control unit, and may be determined by sensing a distance between the visible filter and the electromagnet.

When a low signal is applied to the power, the IR filter may move to be between the lens and the 3D image sensor during a period of time 930. A high signal may not be input to the 3D image sensor. That is, the 3D image sensor may not operate. During a period of time 940 in which a high signal is input to the 3D image sensor, the 3D image sensor may create a depth image from an IR ray filtered by the IR filter. That is, during the period of time 940, the 3D image sensor is activated and a high signal is applied to the 3D image sensor and a low power signal is applied to the power. The period of time 930 may be set in advance by the control unit, and may be determined by sensing a distance between the IR filter and the electromagnet.

A high signal may correspond to an anode signal supplied from a power source, and a low signal may correspond to a cathode signal supplied from the power source. Alternatively, a high signal may correspond to a digital signal corresponding to a bit "1", and a low signal may correspond to a digital corresponding to a bit "0".

As can be seen from FIG. 9, a high signal and low signal may be applied to the power and the 3D image sensor may be operated according to whether a color image or depth image is desired to be created. In one embodiment, the color image and depth image may be obtained in a sequential fashion, where the visible filter and IR filter are moved back and forth such that each time the 3D image sensor is operated a different filter is positioned between the lens and the 3D image sensor.

Figure 10:
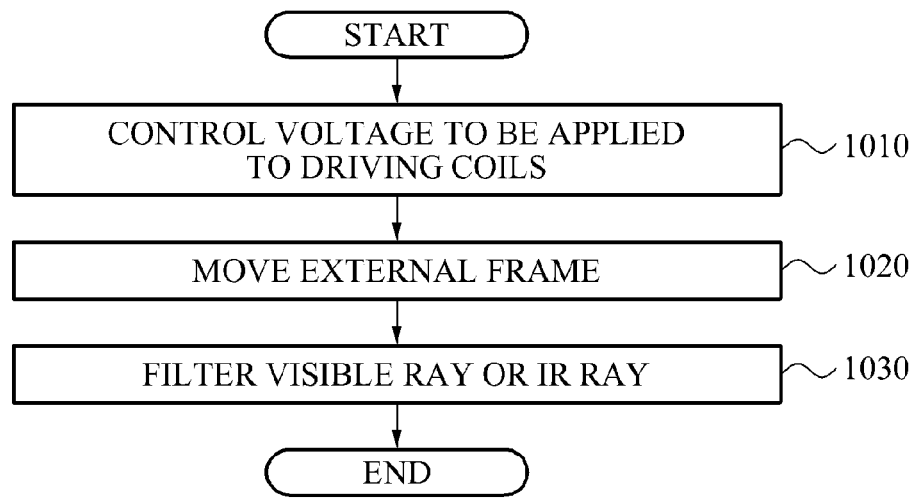
FIG. 10 illustrates a method of capturing a color image and a depth image according to an embodiment.

FIG. 10 illustrates a method of capturing a color image and a depth image according to an embodiment.

In operation 1010, a color image and depth image capturing apparatus may control voltage to be applied to driving coils based on a distance between an external frame and at least one of the driving coils.

In operation 1020, the color image and depth image capturing apparatus may move the external frame by pushing or pulling the external frame based on the polarity of a signal applied to the driving coils.

In operation 1030, the color image and depth image capturing apparatus may employ a frame having a designated polarity, the frame including an external frame to support a plurality of filters, and in which the plurality of filters may filter at least one of an invisible ray and an IR ray from a ray input via a lens. An invisible ray may refer to light that is not within the visible light spectrum.

Here, the filters may include a visible filter to filter a visible ray and an IR filter to filter an IR ray.

When the filters are positioned between the lens and the 3D image sensor, the color image and depth image capturing apparatus may synchronize an operation of the filters and an operation of the 3D image sensor so that the 3D image sensor may create a color image or a depth image.

The 3D image sensor may create a color image from a visible ray that is filtered by the lens and the visible filter. The 3D image sensor may create a depth image from an IR ray that is filtered by the lens and the IR filter. The 3D image sensor may create a 3D image using the color image and the depth image.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. The one or more processors may include a microprocessor, central processing unit (CPU), digital signal processor (DSP), or application-specific integrated circuit (ASIC), as well as portions or combinations of these and other processing devices.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In the apparatus and method for capturing color images and depth images according to the above-described embodiments, it has been disclosed that the IR filter may be relatively closer to the first driving unit while the visible filter may be relatively closer to the second driving unit. However, the disclosure is not so limited. For example, the positioning of the IR filter and visible filter may be switched. Also, the above-example embodiments have disclosed a substantially rectangular external frame which accommodates the visible filter and IR filter. However, the disclosure is not so limited. For example, one of ordinary skill in the art would understand that variations may be made such that the visible filter and IR filter may have a circular or oval shape, or a polygonal shape, and that the external frame and filter frame units may be modified to accommodate these shapes. For example, the external frame may be modified and the external frame may be segmented appropriately to include portions which are magnetic such that the external frame may easily be moved within the filter frame. In alternative embodiments, the apparatus for capturing a color image and a depth image may be modified such that the external frame including the visible filter and IR filter are moved in a vertical direction or a clockwise or counterclockwise direction to position the visible filter and IR filter appropriately such that the filters are positioned between the lens and the 3D image sensor.

In the apparatus and method for capturing color images and depth images according to the above-described embodiments, it has been disclosed that a magnitude and/or polarity of voltage may be supplied by the power unit to move the IR filter or visible filter toward an electromagnet until the IR filter or visible filter is a predetermined distance away from the electromagnet. A database or lookup table may be employed in the apparatus such that the control unit and power unit supply or adjust power according to the distance that the IR filter or visible filter is away from the predetermined distance.

Although example embodiments have been shown and described, it would be appreciated by those skilled in the art that changes may be made to these embodiments without departing from the principles and spirit of the disclosure, the scope of which is defined by the claims and their equivalents.

What is claimed is:

1. An apparatus for capturing a color image and a depth image, the apparatus comprising:
    a filtering unit having an external frame to support a plurality of filters, and configured to filter at least one of visible rays and infrared (IR) rays;
    a driving unit configured to move the filtering unit by pushing or pulling the external frame based on a polarity of an applied signal; and
    a control unit configured to control a voltage to be applied to the driving unit based on a distance between the filtering unit and the driving unit,
    wherein, based on a polarity that occurs according to a voltage applied to a coil,
        the driving unit is configured to perform a pushing operation with respect to the external frame in the case of having a polarity identical to a polarity of the external frame, and
        perform a pulling operation with respect to the external frame in the case of having a polarity different from the polarity of the external frame.

2. The apparatus of claim 1, wherein the filtering unit comprises:
    a visible filter configured to filter the visible rays; and
    an IR filter configured to filter the IR rays.

3. The apparatus of claim 2, further comprising a lens and a three-dimensional (3D) image sensor, wherein when the visible filter or the IR filter is positioned between the lens and the 3D image sensor, the control unit is configured to controls an operation of the 3D image sensor based on a position of the visible filter or the IR filter so that the 3D image sensor creates a color image or a depth image.

4. The apparatus of claim 1, further comprising:
    a frame unit spaced apart from the filtering unit by a desired distance to support the filtering unit.

5. The apparatus of claim 4, wherein the frame unit comprises:
    a first frame comprising a first magnetic portion, a second magnetic portion, and a first connecting portion connecting the first magnetic portion and the second magnetic portion to form a substantially u-shaped first groove in the first frame; and
    a second frame comprising a third magnetic portion, a fourth magnetic portion, and a second connecting portion connecting the third magnetic portion and the fourth magnetic portion to form a substantially u-shaped second groove in the second frame, and
    a first surface of the external frame is spaced apart from the first magnetic portion, the second magnetic portion, and the first connecting portion to be positioned in the first groove, and a second surface of the external frame is spaced apart from the third magnetic portion, the fourth magnetic portion, and the second connecting portion to be positioned in the second groove.

6. The apparatus of claim 4, wherein the control unit is configured to controls a strength of a signal to be applied to the driving unit based on a length and a weight of the external frame, a length of the frame unit, and a number of windings of a coil that constitutes the driving unit.

7. The apparatus of claim 1, wherein:
    the driving unit comprises a first driving coil and a second driving coil disposed adjacent to opposite surfaces of the external frame, and
    based on a voltage applied to the first driving coil and the second driving coil,
        when the first driving coil performs the pushing operation with respect to the external frame, the second driving coil is configured to perform the pulling operation with respect to the external frame, and
        when the first driving coil performs the pulling operation with respect to the external frame, the second driving coil is configured to perform the pushing operation with respect to the external frame.

8. The apparatus of claim 1, wherein the control unit is configured to controls a magnitude of voltage to be applied to the driving unit so that the filtering unit and the driving unit are separate from each other by at least a desired distance.

9. The apparatus of claim 7, wherein the control unit is configured to controls a polarity of voltage to be applied to the first driving coil to be opposite to a polarity of voltage to be applied to the second driving coil.

10. The apparatus of claim 1, further comprising:
    a detection unit disposed between the driving unit; and
    the filtering unit is configured to detect a distance between the external frame and the driving unit.

11. The apparatus of claim 1, further comprising:
    a three-dimensional (3D) image sensor configured to create a color image from the visible rays filtered by the filtering unit, and create a depth image from the IR rays filtered by the filtering unit.

12. An apparatus for capturing a color image and a depth image, the apparatus comprising:
    a filtering unit including an external frame to support a plurality of filters, and configured to filter at least one of visible rays and (IR) rays;
    a driving unit configured to move the filtering unit by pushing or pulling the external frame based on a polarity of an applied signal; and
    a control unit configured to synchronize an operation of the filtering unit and an operation of a three-dimensional (3D) image sensor so that the 3D image sensor creates a color image or a depth image, when the filtering unit is positioned between the lens and the 3D image sensor, wherein, based on a polarity that occurs according to a voltage applied to a coil, the driving unit is configured to perform a pushing operation with respect to the external frame in the case of having a polarity identical to a polarity of the external frame, and perform a pulling operation with respect to the external frame in the case of having a polarity different from the polarity of the external frame.

13. The apparatus of claim 12, wherein the control unit is configured to controls a magnitude of voltage to be applied to the driving unit so that the filtering unit and the driving unit are separate from each other by at least a desired distance.

14. An apparatus for capturing a color image and a depth image, the apparatus comprising:

an infrared (IR) filter;

a visible filter adjacent to the IR filter;

an external frame supporting the IR filter and the visible filter, and having magnetism; and a driving unit periodically having magnetism identical to or different from the magnetism of the external frame, wherein, based on a polarity that occurs according to a voltage applied to a coil, the driving unit is configured to perform a pushing operation with respect to the external frame in the case of having a polarity identical to a polarity of the external frame, and perform a pulling operation with respect to the external frame in the case of having a polarity different from the polarity of the external frame.

15. A method of capturing a color image and a depth image, the method comprising:

controlling a voltage to be applied to driving coils based on a distance between an external frame and at least one of the driving coils;

moving the external frame by pushing or pulling the external frame based on a polarity of a signal applied to the driving coils; and filtering at least one of visible rays and infrared (IR) rays according to the movement of the external frame, wherein the moving the external frame comprises:

based on a polarity that occurs according to a voltage applied to the driving coils, performing a pushing operation with respect to the external frame in the case of having a polarity identical to a polarity of the external frame, and performing a pulling operation with respect to the external frame in the case of having a polarity different from the polarity of the external frame.

16. The method of claim 15, wherein:

the filters comprise visible filter to filter the visible rays or an IR filter to filter the IR rays, the method further comprises:

synchronizing an operation of the filters and an operation of a three-dimensional (3D) image sensor so that the 3D image sensor creates a color image or a depth image when the filters are positioned between a lens and the 3D image sensor.

17. A method of capturing a color image and a depth image, the method comprising:

sequentially applying a first voltage to a first driving unit to move a filtering unit including a plurality of filters to position a first filter between a lens and a three-dimensional (3D) image sensor;

applying a second voltage to the first driving unit to move the filtering unit to position a second filter between the lens and the 3D image sensor;

detecting a distance between the first driving unit and the filtering unit when the filtering unit is moved by applying the first voltage; and stopping movement of the filtering unit when the filtering unit is a first desired distance away from the first driving unit.

18. The method of claim 17, further comprising:

creating one of a color image or a depth image when the first filter is positioned between the lens and the 3D image sensor; and creating one of a color image or a depth image when the second filter is positioned between the lens and the 3D image sensor.

19. The method of claim 17, further comprising:

detecting a distance between a second driving unit and the filtering unit when the filtering unit is moved by applying the second voltage, and stopping movement of the filtering unit when the filtering unit is a second desired distance away from the second driving unit.

20. The method of claim 19, further comprising:

switching the 3D image sensor from a non-operating state to an operating state when the filtering unit is the first desired distance away from the first driving unit and creating one of a color image or a depth image, and switching the 3D image sensor from a non-operating state to an operating state when the filtering unit is the second desired distance away from the second driving unit and creating one of a color image or a depth image.

* * * * *